(12) United States Patent
Wehinger et al.

(10) Patent No.: US 12,106,611 B2
(45) Date of Patent: Oct. 1, 2024

(54) OBTAINING A SENSOR DATA SET OF A VEHICLE OF A VEHICLE FLEET

(71) Applicant: Volkswagen Aktiengesellschaft, Wolfsburg (DE)

(72) Inventors: Jan Wehinger, Braunschweig (DE); Svenja Kristin Kurle, Braunschweig (DE); Sebastian Höflich, Lübeck (DE); Jonas Rathke, Munich (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 298 days.

(21) Appl. No.: 17/729,261

(22) Filed: Apr. 26, 2022

(65) Prior Publication Data

US 2022/0343700 A1   Oct. 27, 2022

(30) Foreign Application Priority Data

Apr. 26, 2021 (DE) ..................... 10 2021 204 143.4

(51) Int. Cl.
*G07C 5/00* (2006.01)
*B60W 60/00* (2020.01)

(52) U.S. Cl.
CPC ........... *G07C 5/008* (2013.01); *B60W 60/001* (2020.02)

(58) Field of Classification Search
CPC ...... G07C 5/008; G07C 5/0841; G06V 20/58; G06V 10/82; G06V 20/56; G06V 10/764; G06V 20/582; G06V 20/584; G06V 10/774; G06V 20/64; B60W 60/001; G01S 17/931; G01S 13/931; G01S 13/86; G01S 13/865; G01S 13/867; G01S 15/931; G01S 17/86; G06N 20/00; G06N 20/10; G06N 3/045; G06N 3/08; G06N 5/04; B60Q 9/008; G05D 1/0246; G05D 1/0248; G05D 1/0257; G06F 18/25; G08G 1/0133; G08G 1/096766; G08G 1/166; H04L 67/12

See application file for complete search history.

(56) References Cited

U.S. PATENT DOCUMENTS

| | | | |
|---|---|---|---|
| 2016/0323065 A1* | 11/2016 | Zhu | H04L 1/0041 |
| 2018/0227743 A1* | 8/2018 | Faccin | H04W 8/08 |
| 2019/0250610 A1* | 8/2019 | Luo | B60W 50/0098 |
| 2021/0271259 A1* | 9/2021 | Karpathy | G06V 10/82 |
| 2023/0023305 A1* | 1/2023 | Spielmann | H04L 67/06 |

* cited by examiner

*Primary Examiner* — Tyler J Lee
*Assistant Examiner* — Yufeng Zhang
(74) *Attorney, Agent, or Firm* — Slayden Grubert Beard PLLC (57) ABSTRACT

A method for obtaining a sensor data set of a vehicle is provided, wherein sensor data of at least one sensor are received. A plurality of triggers for detecting an object or a situation are defined on a server outside the vehicle, each of which said triggers comprises a trigger computing performance value, a trigger classifier, and a trigger requirement. The plurality of triggers are sent to the vehicle. In the vehicle, a respective priority is assigned to the plurality of triggers based on trigger computing performance values, and the trigger classifier of one or more of the triggers is applied to sensor data according to their priority, if a computing capacity of the vehicle permits, from which a respective classifier score results. The sensor data set is sent to the server only if the respective classifier score satisfies the trigger requirement of the respective trigger.

20 Claims, 2 Drawing Sheets

OBTAINING A SENSOR DATA SET OF A VEHICLE OF A VEHICLE FLEET

CROSS-REFERENCE TO RELATED APPLICATIONS

This application claims priority to German Patent Application No. DE 10 2021 204 143.4, filed Apr. 26, 2021 with the German Patent and Trademark Office. The contents of the aforesaid Patent Application are incorporated herein for all purposes.

TECHNICAL FIELD

The present invention relates to a method for obtaining a sensor data set of a vehicle of a vehicle fleet, wherein sensor data of at least one sensor of the vehicle are received in the vehicle. Moreover, the present invention relates to a corresponding system comprising a vehicle fleet and a vehicle-external server.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

The performance of a learning algorithm increases when the training data used to train it have the following three characteristics: comprehensive, diversified and real. For correct identification and interpretation of stop signs, for example, a large training data set (e.g., 100,000 to millions of stop signs), diversified training data (e.g., images of stop signs under trees, partially obscured behind a vehicle as well as held by a construction worker in an active or inactive status) are required, and they must originate from the real world in order to not be surprised by rare variants. An active search for suitable sensor data that represent these situations in reality, performed with aid of the entire vehicle fleet, is referred to as "active learning."

This example shows that the larger and more globally distributed a fleet collected own data is, the better and quicker data to train learning algorithms may be collected. To this extent, a large fleet may significantly reduce the development time per function, compared to a small fleet.

The detection and processing of sensor data requires high computing capacities, however. High-performance computers with corresponding computing capacities—so-called InCar application servers—are installed in contemporary vehicles for realizing modern assistance or autonomous driving functions. Since the driving functions do not consistently load the high-performance computers, unneeded computing capacities may be supplied to third parties that want to operate the software on the InCar application servers. This includes particularly access to the sensor data through active learning in order to thus generate new training data.

SUMMARY

A need exists for an efficient collection of data from a vehicle fleet.

The need is addressed by a method and a system in accordance with the independent claims. Embodiments of the invention are described in the dependent claims, the following description, and the drawings.

DESCRIPTION

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In some embodiments, a method for obtaining a sensor data set of a vehicle of a vehicle fleet is supplied. A sensor data set may be a complete packet of data that were obtained with aid of a sensor of the vehicle. An example of such a sensor data set would be a video sequence that was recorded by a vehicle camera. The vehicle belongs to a vehicle fleet, to which a plurality of vehicles is consolidated. For example, this involves all vehicles of a manufacturer, or at least one or more types of vehicles of a manufacturer.

In the method, sensor data of at least one sensor of the vehicle are received in the vehicle. For example, this receiving of the sensor data takes place through a corresponding data processing apparatus of the vehicle. Data from a plurality of sensors, such as cameras, radar apparatuses, ultrasound sensors and the like may be received by the data processing apparatus.

A plurality of triggers are in some embodiments defined or supplied on a server outside of the vehicle for detecting, respectively, an object or a situation. The trigger here may be understood to be an initiation function for the detection, or a conditional detection function. With such a detection function, an object, such as a stop sign, or a situation, such as identifying right before left, may be detected. Such a trigger may in some embodiments have a computing performance value, a trigger classifier, and a trigger requirement. The trigger computing performance value may be a specified value for a computing performance (e.g., value for a computing operation). In this context, it may be a priority value for example, or a monetary value with which the respective computing performance is evaluated, for example. Therefore, a high priority or a high monetary value may be established for a desired computing performance, for example. The trigger classifier may be a classification algorithm with which the sensor data are classified. For example, such a trigger classifier may be realized through a learning algorithm. The trigger requirement is a condition with which the classifier result may be evaluated in order to transit the sensor data to the server outside of the vehicle.

A plurality of such triggers are sent to the vehicle in some embodiments. Which units the triggers are sent to the vehicle from is of secondary importance. The triggers may be transmitted from the server to the vehicle. In general and in some embodiments, the triggers may also be transmitted to the vehicle from other units (e.g., including other vehicles), however.

In the vehicle and in some embodiments, the plurality of triggers is assigned a respective priority based on their respective trigger computing performance values. For example, the priority of a trigger is higher than that of another trigger if its trigger computing performance value is higher. If the trigger computing performance value is already a priority value, this assignment step may be dispensed with, or this assignment step takes place through reading of this trigger. If conversely the trigger computing performance value is a monetary value, for example (e.g., €1.1 per unit computing operation (UCO)), that trigger is assigned a higher priority, which represents, e.g., a higher monetary value per computing operation.

The respective trigger classifier of one or more of the triggers may then be applied directly or indirectly to the sensor data according to their priority, insofar as a computing capacity of the server of the vehicle permits. This means that the trigger classifier with the highest priority is applied first, and the trigger classifier of a trigger with the second-highest priority only thereafter, if the computing capacity of the server do not permit the simultaneous application of both trigger classifiers. If applicable, however, a trigger classifier of a third trigger may take priority over the second trigger if it is possible within the scope of the computing capacity for the first trigger and the third trigger to be processed jointly, for example. In any case, the triggers may be processed within the scope of the computing capacity of the server according to their priority. In this context, the respective trigger classifier may be applied to the sensor data directly or indirectly. In the case of indirect application, a corresponding preprocessing may take place beforehand. In applying a respective trigger classifier, a respective classifier score results. This classifier score indicates the quality of the classification. For example, the higher this classifier score, the higher the probability that the sensor data actually fall within a certain class.

In some embodiments, based on the sensor data from the vehicle, the sensor data set is sent to the server outside of the vehicle, but only if the respective classifier score satisfies the trigger requirement of the respective trigger. Therefore, for example, the sensor data set is only transmitted to the vehicle-external server if the classification result has a high value, i.e., is high-quality. Therefore, for example, the trigger requirement may be 100, and the sensor data set is only transmitted to the vehicle-external server if the classification result, i.e., the classifier score, is over 100. In this manner, it may be ensured that high-quality sensor data are supplied for the general public, for example, or for the vehicle fleet.

In some embodiments, it is provided that each trigger respectively has a trigger condition, and the respective trigger classifier is only applied under the condition that the sensor data directly or indirectly satisfy the respective trigger condition. Therefore, the trigger condition defines the condition under which the trigger is to be applied. For example, the trigger condition may be that the trigger is only to be applied to German vehicles. Another trigger condition may be that the trigger is only to be applied to a predetermined vehicle type. The sensor data may in some embodiments satisfy the trigger condition directly, i.e., without processing. Alternatively, the sensor data may be preprocessed, and only after the preprocessing it is checked whether the trigger condition is satisfied. In this case, the sensor data satisfy the trigger conditions indirectly.

In some embodiments, it may be provided that the objects that are to be detected with the plurality of triggers are specified events or objects on or along a roadway. The objects may be traffic signs, traffic lights, or the like, for example. These are situated along or on the roadway and may thus be detected by the sensors of the vehicle. The events may be situations and events, or objects in states (e.g., dog runs toward road, vehicle door is opened).

For example, the plurality of triggers are sent from the server to at least one further vehicle, where they are used as in the first vehicle. This means that the plurality of triggers is not only sent to a single vehicle, but rather to a plurality of vehicles, or all vehicles of a vehicle fleet. In this manner, it is possible for the entire computing capacity of all vehicles of the vehicle fleet, or at least some of the vehicles of the vehicle fleet, to be exploited in order to detect the data. Then in each vehicle, the received triggers are used according to their trigger conditions.

In some embodiments, one of the plurality of triggers contains a value threshold, and the application of the respective trigger classifier is only executed until a computing performance rendered in the vehicle in relation to the respective trigger, multiplied by the computing performance value, still remains below the value threshold. Of course, it may be provided that not only one, but rather a plurality of, or all triggers, contain a corresponding individual value threshold, if applicable. The computing performance may be measured in computing operations, for example. The computing performance value corresponds, for example, to the relation involving the priority or the monetary value that may be assigned to one or a plurality of computing operations. The product of computing performance and computing performance value yields a value (e.g., priority value, cost factor, or monetary value) for the rendered computing performance. If this value for the rendered computing performance exceeds the stated value threshold of the trigger, the trigger or the trigger classifier is no longer executed. This means that the trigger only works until the costs remain below a certain target, for example.

In some embodiments, it may be provided that one of the plurality of triggers contains a trigger timeframe, and the trigger classifier is only applied within the trigger timeframe. The trigger timeframe is usually characterized by a beginning and an end. If applicable, however, the timeframe may also begin immediately so that the trigger timeframe is sufficiently characterized by an end time-point. Outside the trigger timeframe, the trigger classifier or the trigger is no longer applied. For example, it may be provided that the trigger is only applied for half of a year, in the months from January to June. In an alternative example, it may be provided that the trigger timeframe runs for three months, for example. In another alternative example, a fixed end time-point, e.g. December 31, may be contained in the trigger to define the timeframe. In this manner, the end of the data detection may be controlled in the vehicle fleet.

Furthermore, at least one of the plurality of triggers may contain a trigger target data format that specifies a type, a degree of processing, and/or a format of the sensor data set to be transmitted from the vehicle to the server, wherein the sensor data set is sent in the trigger target data format. The format that the data to be transmitted to the server may be specified through the target data format. For example, with a type specification it may be governed that only video data are detected through the trigger. If applicable, the target data format may also be used to establish the degree of processing of the sensor data. For example, the sensor data are only to be transmitted in the spectral range following a Fourier transformation. The degree of processing may also be used to determine that a desired filtering be performed, for example. Furthermore, the target data format may be used to establish the actual format of the data to be transmitted. For example, in this manner the header of a data set, or the number of data blocks in a data set, may be specified.

In some embodiments, it may be provided that at least one of the plurality of triggers contains a trigger processing time-point that defines a time-point at which the trigger classifier is to be applied, and the method is controlled with the trigger processing time-point. This means that it may be established from the outset that the classifier is to be applied half an hour before sunset, for example. Therefore a trigger searches for video sequences of tunnel exits in low, glaring sun. Since this situation often results in errors in classifying road markings. Another example would be school children with large backpacks for which there is an increased risk of not being classified as people due to the changed silhouette, especially in images from behind, if the algorithm was not previously trained precisely with these images. The triggers for the school children with backpacks could be limited to, or may be for example applied, during the timeframe 7:00-8:00. If applicable, it may additionally be established using the trigger timeframe how long the trigger classifier is to be applied after the trigger processing time-point. If applicable, the sensor data are temporarily stored in the vehicle for a corresponding duration. The trigger time-point may contain a relative specification (e.g., "in a day") or an absolute time specification (e.g., "at 12:00"). In each case, the start time-point or the end-time point of the trigger processing may be established thereby. In this manner, computing capacities of the vehicles may be better exploited, if applicable. Therefore it may be favorable for the processing time-points to be selected during the night, when most vehicles are not in operation.

In some embodiments, it is provided that at least one of the plurality of triggers contains a target data quantity with which a quantity of the sensor data sets to be obtained from the vehicle fleet is defined, and the method is terminated when the target data quantity is reached. In general, a quantity of sensor data may be specified with which a sufficient quality, e.g., for teaching an algorithm, may be achieved. For example, for an algorithm intended to identify a stop sign, it is sufficient for 100,000 images or video sequences to be provided as sensor data. If this target data quantity is achieved, the trigger or trigger classifier is no longer applied.

In some embodiments, a learning algorithm is applied in the vehicle to the sensor data from which the respective classifier score then results, wherein the respective trigger classifier is applied to an intermediate result of the learning algorithm, for example. Such a learning algorithm may be based on a neural network. Alternatively, it may also be based on vector machines, or the like. A high classification quality may be achieved through such a self-learning algorithm.

In some embodiments, a system comprising a vehicle fleet is provided, comprising a plurality of vehicles, and a vehicle-external server for executing an above-described method. The embodiments described above in relation to the discussed method also apply accordingly to the system. This system may contain one or more processors with suitable programming (hardware or software programming) for executing the respective method steps in some embodiments.

Also belonging to the teachings herein are embodiments of the method that have features which have already been described in conjunction with the motor vehicle. For this reason, the corresponding embodiments will not again be described.

The teachings herein also include combinations of the features of the described embodiments.

In the context of this discussion, the terms 'processor', 'controller', and 'circuit' are understood broadly to comprise hardware and hardware/software combinations to provide the respectively discussed functionality. The respective processor, controller, and/or circuit may be formed integrally with each other and/or with further components. For instance, the functionality of the processor, controller, and/or circuit may be provided by a microprocessor, microcontroller, FPGA, or the like, with corresponding programming. The programming may be provided as software or firmware, stored in a memory, or may be provided by dedicated ('hard-wired') circuitry.

Reference will now be made to the drawings in which the various elements of embodiments will be given numerical designations and in which further embodiments will be discussed.

In the exemplary embodiments described herein, the described components of the embodiments each represent individual features that are to be considered independent of one another, in the combination as shown or described, and in combinations other than shown or described. In addition, the described embodiments can also be supplemented by features other than those described.

Specific references to components, process steps, and other elements are not intended to be limiting. Further, it is understood that like parts bear the same or similar reference numerals when referring to alternate FIGS.

The exemplary embodiments described herein represent embodiments. The teachings herein focus on the distribution of computing capacities among the various actors, which want to collect sensor data through the vehicles with aid of active learning. In detail, the systems of the driver assistance system are used for the active learning. In this context, the vehicle sensors (camera, radar, etc.) collect sensor data for the driver assistance system. After preprocessing, these are fed into a learning algorithm, such as a "deep learning neural system". Based on its output, the so-called vehicle control module controls the vehicle (acceleration, steering angle, etc.).

For locating sensor data (e.g., images of stop signs) in the scope of the active learning, so-called trigger classifiers are applied to intermediate results of the learning algorithm, and a so-called classifier score is calculated. These determine the probability whether the sensor data represent a stop sign, for example. If the classifier score is above a threshold value, the sensor data are transmitted to a server outside of the vehicle for further processing via a network interface of the vehicle following processing in a postprocessing module. In the further processing, sensor data are labeled or characterized so that they may later be used as training data for learning algorithms (e.g., for identifying stop signs).

A problem may be for example that the available computing capacities are insufficient to carry out all trigger classifiers originating from different actors (persons or companies that want to detect data). Therefore if applicable, this requires an efficient and effective assignment, pricing and subsequent pricing of computing capacities for the trigger classifiers of the individual actors that are competing for computing performance. This has the result that trigger classifiers are only applied if the probability of generating a relevant sensor data set is the highest.

Known systems for obtaining training data do not regard the distribution of the computing capacities in the vehicles as competing actors that want to collect the sensor data for generating training data. Moreover, they do not offer the options of prioritizing a trigger classifier in its application, or placing it in a competition with others. It is evident therefrom that the developers must independently limit the number of trigger classifiers running simultaneously on the vehicle.

Additionally, these known systems do not have any mechanism for approving trigger classifiers, the trigger condition of which cumulatively corresponds to the current situation and which are therefore executed, but then do not identify any relevant sensor data, or for promoting trigger classifiers with good trigger condition. The result is that computing capacity is taken advantage of by "poorly" defined trigger classifiers, which computing capacity could have been used more efficiently by "better" defined trigger classifiers.

The probability of being able to identify relevant sensor data for generating training data fluctuates significantly depending on the driving situation. Especially in situations in which relevant training data may be identified, individual classifiers must be prioritized in order to not overload the system. A corresponding mechanism would be to dynamically determine the price for the computing operations depending on the probability of obtaining a training data set.

In a concrete example, a method and a computer system are now provided for obtaining and if applicable also for billing for sensor data, for generating training data for assistance systems or autonomous driving systems by active learning.

Figure 1:
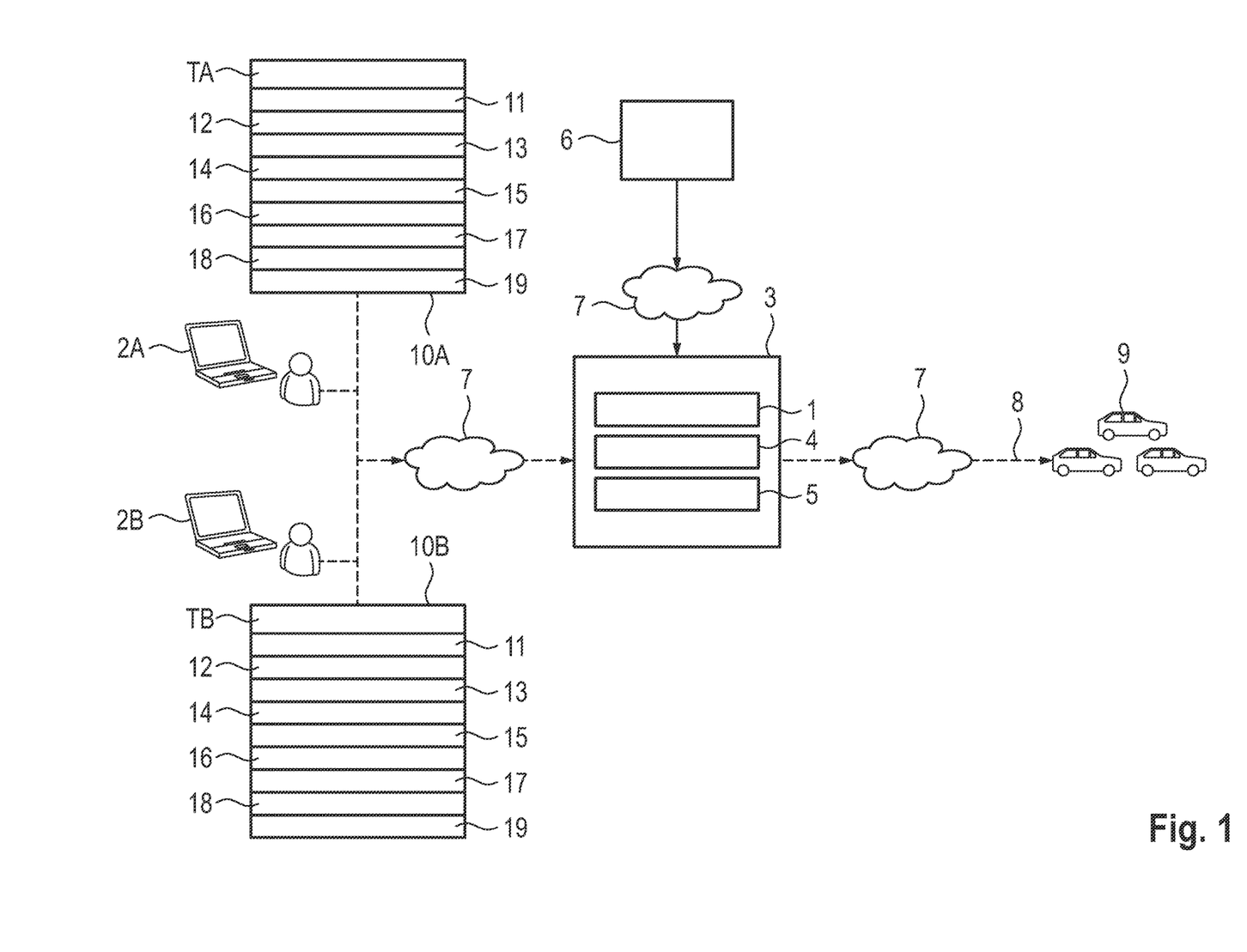
FIG. 1 shows an example flow diagram for an OTA (over the air) update of a vehicle fleet.

For this purpose, a flow diagram for supplying a vehicle fleet 9 with current trigger data is depicted in FIG. 1. Via an application 1, an actor 2A or 2B manages its obtaining of training data for a driver assistance system (DAS) or a highly automated driving system (HAD), with aid of active learning, for example. The application 1 runs on a server 3 outside the vehicle, and through API interfaces 4 (application programming interface) and databases 5 enables their integration into further systems 6. The further systems 6 may serve for automation of further process steps. An example would be a system of a labeling service provider via which the obtained sensor data 50 (cf. FIG. 2) may be used, and thereafter may be used as training data.

The application 1 gives the actor 2A or 2B the option of defining for the vehicle fleet 9 its triggers 10 10A or 10B for obtaining sensor data 50 for generating training data (e.g. for stop sign identification), consisting of trigger condition 11, trigger computing performance value 12 (if applicable, auction bid), trigger classifier 13, trigger requirement 14, trigger value threshold 15 (e.g. budget), trigger timeframe 16, trigger target data format 17, trigger processing time-point 18 and trigger target data quantity 19. The application 1 distributes the triggers 10A or 10B of the individual actors 2A or 2B to the vehicle fleet 9 in order to take advantage of its capacity efficiently and effectively.

Figure 2:
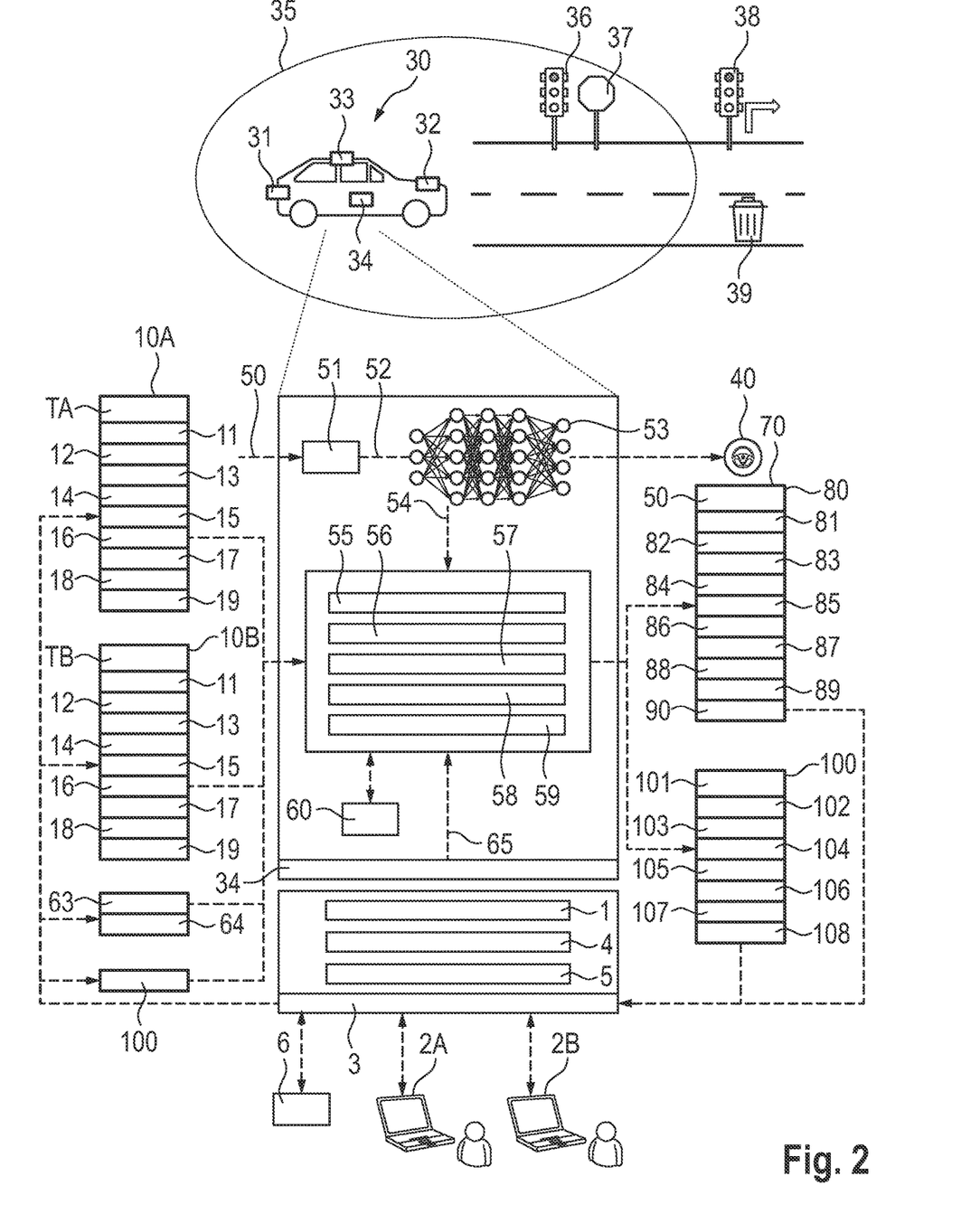
FIG. 2 shows an example data flow diagram for obtaining sensor data for generating training data for an autonomous driving system through active learning.

In this context, the trigger condition 11 defines a respective condition under which the trigger classifier 13 is applied or under which the trigger 10A or 10B is to participate in an auction for applying the trigger classifier 13 in the auction module 56. The trigger computing performance value 12 (e.g. auction bid) defines the maximum bid (e.g. priority value or monetary value) per computing operation in obtaining sensor data for subsequent generation of training data through the application of the trigger classifier 13. The trigger classifier is a learning algorithm 53, for example, such as a Support Vector Machine or a neural network that has been trained with an initial training data set for the respective purpose (e.g. stop sign identification). It is applied through the trigger classifier module 57 to sensor data 50 or to the intermediate results of a learning algorithm 54 to thus identify sensor data sets 50 for potential training data sets. For example, the trigger requirement defines the minimum value of a standardized classifier score 85 at which a sensor data set is to be stored and transmitted. The trigger budget 15 defines the maximum budget established by the actor 2A or 2B that the actor 2B is prepared to pay for obtaining sensor data for subsequent generation of training data with a trigger 10A, 10B in a defined timeframe. The trigger timeframe 16 defines the timeframe in which the trigger 10A, 10B is to be active.

The trigger target data format 17 defines for example the data standard, the degree of processing, the type of sensor data (e.g. video sequence, radar, ultrasound, image details) 50 that are obtained through the triggers 10A, 10B via the vehicle fleet and are to be supplied to the actor 2A, 2B. The trigger processing time-point 18 defines when the trigger classifier 13 is to be applied. This varies for example between "immediately" and "within a plurality of days", wherein the corresponding intermediate results of the learning algorithm 54, and the sensor data 50, are stored on a storage medium 60 on the in-car application server (vehicle internal server) 34 for applying the trigger classifier. In this way the processing of the trigger classifier 13 may be postponed to a timeframe in which other systems require less computing capacity (e.g. vehicle standstill, parking, empty divided highway, etc.).

The trigger target data quantity 19 defines the maximum quantity of sensor data sets 70 that is to be obtained through the trigger 10 via the vehicle fleet 9.

The application 1 supplies the sensor data 50 obtained according to the defined triggers 10 through the vehicles to the actor 2A, 2B in a sensor data set 70, including further metadata 80, if applicable.

The vehicles 30 of the vehicle fleet 9 are for example equipped with vehicle sensors for the driver assistance system 32 (camera, Lidar, radar, ultrasound sensors) that may be oriented in different directions. Moreover, the vehicles may have further systems for detecting and supplying data on vehicle operation and/or on monitoring and/or on the environment, topographies and/or GPS 33. Moreover, a preprocessing module 51 in a vehicle, said module being fed with sensor data 50 from the vehicle sensors 32 for the driver assistance system, may have an image processing processor for example for generating preprocessed sensor data 52. Moreover, the vehicle may have a learning algorithm that is fed with the preprocessed sensor data 52 from the preprocessing module 51. The learning algorithm 53 comprises, for example, a plurality of layers, consisting of an input layer, intermediate layers, and an output layer. The learning algorithm 53 may also comprise convolutional and pooling layers. In this context, the vehicle may be equipped with the previously mentioned vehicle-internal server 34 on which the learning algorithm 53, among others, runs.

A vehicle control module 40 may also be part of the vehicle, said vehicle control module 40 is fed through the output of the learning algorithm 53, and controls the vehicle 30.

Further modules 55 to 59 process the intermediate results 54 of the learning algorithm 53, for example. Thus, for example, a trigger filter module 55 is fed with intermediate results of the learning algorithm, and it selects the triggers 10A, 10B that are permitted to participate in the auction for executing their trigger classifier 13 in the auction module. The trigger filter module 55 thereby limits conditions under which the triggers 10A, 10B participate in an auction for executing the trigger classifier. The intermediate results 54 of the learning algorithm 53 may represent intersections, or street signs on the street. The trigger filter module 55 also takes into account data from other vehicle systems, such as GPS 33, if applicable. The trigger filter module 55 runs on the vehicle-internal server 34.

The auction module 56 is fed with triggers 10A, 10B that are selected by the trigger filter module 55. In this context, on the basis of the individual trigger computing performance values (e.g. trigger auction bids) and data from the respective trigger statistics 100, the auction module 56 selects the triggers 10A, 10B, the trigger classifiers 13 of which are to be applied in the classifier trigger module 57. In the selection, the auction module 56 furthermore takes into account the computing capacity 65 available on the vehicle-internal server 34.

The following data regarding the triggers 10A, 10B or their trigger classifier 13 for example are stored in the trigger statistics 100:
the historic share in results of the individual trigger classifier 101
foreseeably required computing capacity of the trigger classifier 102
trigger exhausted budget 103
trigger number of collected sensor data 104
average computing cost for locating a relevant sensor data set 105
trigger score 106
average classifier score in previous applications of the trigger classifier 107
execution rank, calculated as trigger score x computing performance value or bid 108

The auction module 56, with which a sequence of processing the triggers within the scope of the respective computing capacity is established on each of the vehicles sorts the trigger classifiers 13 to be executed in a variant according to the product of trigger auction bid or trigger computing performance value 12 multiplied by the trigger score 106. In this context, the trigger score 106 may take into account a plurality of influencing factors. Once the exhausted or summed trigger budget 103 (i.e. the evaluation of all computing operations previously executed in the respective vehicle), the trigger budget 15, or the trigger number 104 of the collected sensor data reaches the trigger target data quantity 19, the participation of the trigger 10 in the auction or respectively the execution of the trigger in a vehicle is stopped. To this end, a trigger statistics 100 for example is synchronized across the vehicle fleet 9. If applicable, this also occurs in that the vehicles communicate with a system outside of the vehicle, such as the application 1 mentioned in the preceding, via a network interface 31.

When a trigger 10 leaves the auction (i.e. is no longer executed in accordance with the use strategy), the empty position is filled with the next suitable trigger 10. To the extent possible, a high utilization of the capacity of the vehicle-internal server 34 is always sought, since the number of the applicable trigger classifiers ultimately depends on the computing capacity 65 available on the vehicle-internal server 34.

The trigger classifier module 57 for example applies the trigger classifier 13 to the intermediate results of the learning algorithm 53, and calculates a corresponding classifier score 85. If this satisfies the trigger requirement 14, the associated sensor data 50 are for example supplemented by metadata 80, and sent as sensor data 70 via the network interface 31 to a system outside of the vehicle, such as the application 1 mentioned in the preceding, for example. The trigger classifier module 57 processes the trigger classifiers 13 according to the sequence defined in the auction module 56.

The classifier score 85 may be a normalized floating-point number between −1 and 1 for example that represents the probability that the sensor data 50 represent a positive (or with −1, a negative) example of the respective use case (e.g. stop sign identification). In this context, the threshold value for transmission may be >0.5 for positive examples and <−0.5 for sought negative examples.

If applicable, a value ascertaining module 58 calculates the value (e.g. sum of evaluation points or price) for the individual actor 2 for obtaining sensor data 50 according to the trigger classifier 10 for generating training data. To this end, the trigger classifier module 57 feeds the value ascertaining module 58 with data regarding the corresponding sensor data 50. These data comprise for example the sum of executed computing operations 89, and the data quantity 87 to be transmitted through the network interface 31.

The total value for the sensor data 50 results from a value arising from an auction (e.g. price) per computing operation 88, and the number of executing computing operations 89. The costs or value share for the data transmission are additionally added to this. They result from the transmitted data quantity 87 and the value 63 for the data transmission (e.g. per megabyte). As a further boundary condition aside from the value 63 for the data transmission, a minimum value 64 per computing operation may be defined by the system operator.

The sensor data 50 determined through the trigger classifier 13 are processed in a postprocessing module 59 in order to improve the quality, and/or to reduce the quantity of the data to be transmitted via the network. These are then for example supplemented by metadata 80 from other vehicle systems and sensors 33, and combined into a sensor data set 70. This includes for example a time stamp 81, a trigger ID 82, a learning algorithm ID 83, a location 84, a classifier score 85, a vehicle monitoring parameter 86 (e.g. an operating condition such as speed, acceleration, steering angle, and braking force). Moreover, the values determined for the sensor data set 90 for the actor 2 are to be stated through the evaluation module 56 and the value ascertaining module 58.

If applicable, a network interface 31 sends the sensor data set 70 compiled by the postprocessing module 59 to a system outside of the vehicle, such as the application 1 mentioned in the preceding, for example. The actor 2 that defined the corresponding trigger 10 may have access to the sensor data set 70 via the system operated outside of the vehicle, such as the application 1 mentioned, for example. The sensor data set 70 is also optionally accessible to further systems via the API interface 4. Furthermore, the vehicle may comprise a storage medium 60 on which the processed sensor data, such as metadata and raw sensor data may be temporarily stored either in the event of low available computing capacity 65, or also in the event of poor or no connectivity.

According to an exemplary embodiment, an auction mechanism with the following ten steps may therefore be supplied for computing capacities in the vehicle of a vehicle fleet for obtaining sensor data for the subsequent generation of training data for assistance systems or autonomous driving systems, through active learning, wherein the participation in the auction depends upon the detected sensor data.

1. Receiving sensor data 50 from vehicle sensors for the DAS 32 in accordance with their sensor range 35, and data from further vehicle systems, such as a GPS module 33.

2. Applying a learning algorithm 53 to the sensor data 50.

3. Defining a trigger 10 via a system outside of the vehicle 5 through an actor 2, and transmitting the trigger 10 to selected vehicles 30 of a vehicle fleet 9, e.g. via OTA update 8 via a network 7.

4. Applying the trigger filter module 55 for limiting conditions under which a trigger 10 participates in an auction for executing the own trigger classifier.

5. Applying an auction subject to trigger classifiers 13 previously selected through filters, wherein the computing performance values 12 of the triggers 10 are taken into account in value points per computing operation, and further trigger statistics 100. This includes available computing capacities 65, an historic share in results 101 of the individual trigger classifiers in its application, the foreseeably required computing capacity 102 of the trigger classifier, and a trigger score 106.

6. Applying the trigger classifier 13 selected through the auction to intermediate results of the learning algorithm 53 for calculating a classifier score 85 for the sensor data 50.

7. Valuating (e.g. pricing) the execution of the trigger classifier according to the value arising from the auction (e.g. price) per computing operation 88, the number of executed computing operations 89, and the data quantity 87. In this context, the value per computing operation 88 corresponds at least to a minimum value 64 per computing operation stored in a system. This also applies if only one trigger 10 participates in an auction.

8. Deciding whether the data are to be sent via a network 7 as a sensor data set 70 with at least a part of the sensor data and further metadata 80 (at least one classifier score) via a network 7 to a system 3 outside of the vehicle.

9. Transmitting the sensor data set 70 to a system outside of the vehicle for supplying the data to the actor 2, wherein the system enables the integration of further systems 6 through API interfaces 4.

10. Synchronizing the trigger statistics 100 between the vehicles 30 of the fleet 9 via a system outside of the vehicle, such as an application 1, for example.

In a concrete exemplary embodiment, an engineer could be assigned the task of developing detection of a stop sign 37 as an additional feature for a driver assistance system or a highly automated driving system. For this purpose, the engineer creates a new trigger 10 in the application 1. The trigger 10 is as described below, for example:

trigger condition 11: The trigger classifier 13 is only to be applied at intersections; to be applied to the entire vehicle fleet 9 in Germany trigger auction bid 12: €1.1 for unit computing operations (UCO)

trigger classifier 13: a learning algorithm trained with 1000 stop signs trigger requirement 14: Classifier score 85>0.7 trigger budget 15: 100,000 euro trigger timeframe 16: until 2024 Jan. 20 trigger target data format 17: stop sign (image section, .JPG)+radar (whole set, point cloud)

trigger processing time-point 18: immediately trigger target data quantity 19: 1 million sensor data sets 70.

So that the trigger filter module 55 subsequently applies the trigger conditions 10 to the correct intermediate results of the learning algorithm 53, the intermediate layers of the learning algorithm 53 that show e.g. an intersection are stored in a database 5, for example. In addition there are exclusive conditions: For example, applying the trigger classifier 13 at locations 84 at which previously the trigger classifier 13 was applied by a vehicle 30 from the fleet 9 in a defined timeframe, and if applicable, generated a sensor data set 70. On the basis of the inputs, the application calculates the foreseeable price per sensor data set corresponding to similar triggers 10, and displays this to the actor 2.

The engineer then confirms the order. After a thorough security and system compatibility assessment, the application 1 sends the trigger 10 (used as representative for 10A and 10B) to the corresponding vehicles 30 in the vehicle fleet 9. In this case, these are all vehicles 30 in Germany. An LTE network, for example, is used as the network 7 for transmitting the data. The vehicle receives the trigger 10 via the network interface 31 and installs the trigger 10 via OTA update 8 on one of its vehicle-internal servers 34.

The vehicle sensors for the DAS 32 (including camera, radar, ultrasound sensors) feed sensor data 50 to a preprocessing module 51 that normalizes the data, and applies filters.

The processed sensor data 52 from the preprocessing module 51 are fed to a learning algorithm 53.

The trigger filter module 55 is fed with intermediate results of the learning algorithm 53, and compares these with the trigger conditions 11. In addition, the trigger filter module 55 compares the GPS signal of the vehicle 33 to the coordinates stored on a map. In this case, they are the coordinates of intersections, according to the trigger conditions 11. If the vehicle approaches an intersection, the trigger filter module 55 checks based on the trigger "stop sign" 10A whether the output of a defined intermediate layer of the learning algorithm 53 possesses the characteristics defined in the trigger condition 11. If this is the case, the trigger filter module 55 sends a signal to the evaluation module 56.

The evaluation module 56 or the auction module accesses the individual trigger computing performance values (here, trigger auction bids) 12, and sorts these according to their bid into € per unit computing operations (UCO). The auction module 56 may process thousands of trigger auction bids 12 simultaneously. To simplify the example, four are stated here:

| trigger 10 | share in results 101 | computing demand 102 | auction bid 12 |
|---|---|---|---|
| (1.) stop signs 37 | 30% | 5 UCO | € 1.1/UCO |
| (2.) Garbage cans on the road 39 | 10% | 3 UCO | € 1.0/UCO |
| (3.) Traffic lights (blue light) 36 | 5% | 2 UCO | € 0.8/UCO |
| (4.) Traffic lights (free to turn right) 38 | 15% | 4 UCO | € 0.7/UCO |

If applicable, in addition to the information defined by the actor 2, the auction module 56 takes into account further trigger statistics 100. This includes the trigger score 106. In combination with the trigger auction bid 12, it influences the sequence in which the trigger classifiers are processed. It may take into account a plurality of influential factors. In simplified form, the trigger score 106 in this example is composed of the following three factors:

historical share in results 101 of the individual trigger classifier, in percent [trigger score 106>threshold value from the trigger requirements 14]

average computing cost 105 (across the entire system, including failures) for locating a relevant sensor data set 90 average classifier score 107 in previous applications of the trigger classifier 10

The following formula applies:

trigger score 106=share in results 101/avg. computing cost 105\*avg. classifier score 107

| Trigger 10 | Share in results 101 | Avg. computing cost 105 | Avg. classifier score 107 | Trigger score 106 |
|---|---|---|---|---|
| (1.) 37 | 30% | 30 UCO | 0.4 | 0.00400 |
| (2.) 39 | 10% | 20 UCO | 0.2 | 0.00100 |
| (3.) 36 | 5% | 30 UCO | 0.1 | 0.00017 |
| (4.) 38 | 15% | 10 UCO | 0.25 | 0.00375 |

Through multiplication of the trigger score 106 by the auction bid 12, the auction module 56 calculates the execution rank 108 of the trigger.

| Trigger 10 | Trigger score 106 | Bid 12 | Execution rank 108 |
|---|---|---|---|
| (1.) Stop signs 37 | 0.00400 | € 1.1/UCO | 0.00440 |
| (2.) Garbage cans on the road 39 | 0.00100 | 1.0 cents/UCO | 0.00100 |
| (3.) Traffic lights (blue instead of green light) 36 | 0.00017 | € 0.8/UCO | 0.00013 |
| (4.) Traffic lights (free to turn right) 38 | 0.00375 | € 0.7/UCO | 0.00263 |

In the following, the individual triggers 10 are sorted according to this execution rank 108.

| Trigger 10 | Trigger score 106 | Bid 12 | Execution rank 108 |
|---|---|---|---|
| (1.) Stop signs 37 | 0.00400 | € 1.1/UCO | 0.00440 |
| (4.) Traffic lights (free to turn right) 38 | 0.00375 | € 0.7/UCO | 0.00263 |
| (2.) Garbage cans on the road 39 | 0.00100 | € 1.0/UCO | 0.00100 |
| (3.) Traffic lights (blue instead of green light) 36 | 0.00017 | € 0.8/UCO | 0.00013 |

Accordingly, the trigger classifier 13 of a trigger 10 is processed with the highest execution rank 108. In a variant, stochastic methods such as, for example, a distribution function with a random variable may influence the sequence.

Once the vehicle-internal server 34 reaches its capacity limits, the trigger classifiers 13 beginning with the lowest execution rank 108 are no longer processed immediately in ascending order. If the user in defining the trigger 10 also accepts deferred processing according to the trigger processing time-point 18, e.g. up to four hours, the necessary data (including sensor data, intermediate result of the learning algorithm 53) are stored temporarily. If the storage medium 60 reaches its limits, the data for the individual trigger classifiers 13 are again deleted in ascending order according to their product.

Once the evaluation or auction module 56 receives a signal from the trigger filter module 55 stating that the output of a defined intermediate layer of the learning algorithm 53 satisfies the trigger conditions, the auction module 56 establishes the price/computing operation 88 to be paid. This results from the quotient of the next lowest execution rank of a trigger 10 that was previously executed in a defined timeframe (e.g. in the last five minutes), and the own trigger score 106 plus a minimum value 64. In another variant, all triggers 10, the objects to be detected of which are situated in a sensor range 35, are taken into account in the pricing.

| Trigger 10 | Trigger classifier score 106 | Bid 12 | Execution rank 108 | Executed in the defined timeframe? |
|---|---|---|---|---|
| (1.) Stop signs 37 | 0.00400 | € 1.1/UCO | 0.00440 | Yes |
| (4.) Traffic lights (free to turn right) 38 | 0.00375 | € 0.7/UCO | 0.00263 | No |
| (2.) Garbage cans on the road 39 | 0.00100 | € 1.0/UCO | 0.00100 | Yes |
| (3.) Traffic lights (blue instead of green light) 36 | 0.00017 | € 0.8/UCO | 0.00013 | No |

From this results a price for the stop sign trigger 37 of 0.001/0.004\*1.1+0.01=€0.285/UCO 88.

The trigger classifier module 57 that is fed with the data from the auction module 56 and the intermediate results of the learning algorithm 53 now executes the selected trigger classifiers 13, and calculates a corresponding classifier score (The sequence of the triggers should not be recalculated before every application of a trigger classifier, but rather it should be updated e.g. once per minute. The constant recalculation would otherwise cost too much in computing performance). In our case, the trigger classifier 13 applies its small, learning algorithm (trained with approx. 1000 stop sign images) to the sensor data 50 collected in the scope of crossing an intersection, and calculates a classifier score 85. In the described case, with a value of 0.9, the classifier score 85 exceeds the threshold value of 0.7 defined in the trigger requirements 14. Accordingly, the sensor data 50 are selected for transmission.

Before transmission of the data, the sensor data 50 are now processed in the postprocessing module 59 to improve the quality and/or reduce the quantity of the data to be transmitted via the network, if this has been defined accordingly by the actor in the target data format 17. The postprocessing module 59 further supplements the sensor data set 70 with inter alia further metadata 80 (e.g. time stamp 81, trigger ID 82, learning algorithm ID 83, location 84, classifier score 85, vehicle monitoring parameters/operating conditions 86 such as speed, acceleration, steering angle, braking force). Moreover, the price for the sensor data set 90 determined through the auction module 56 and the pricing module 58 is to be stated.

The price for the sensor data set 90 results from the price per computing operation 88 determined in the auction, the number of computing operations 89 executed, the data quantity 87 to be transmitted, and the price per transmitted megabyte 59.

In this case of the stop sign trigger 37, this means:

€0.285/UCO 88\*5 UCO 89+0.8 MB 87\*€0.1/MB=€1.505/sensor data set 90

The network interface 31 sends the sensor data set 70 compiled through the postprocessing module 59 to a database 5 that is operated on a server outside of the vehicle. The actor 2 that defined the corresponding trigger 10 has access to the sensor data set 70 stored in a database 5 via the mentioned application 1. If the sensor data 70 have reached the target data quantity 19, the participation of the trigger 10 in the auction is stopped, and corresponding updates of the trigger 10 are sent to the vehicle fleet 9 via a network 7, e.g. via the LTE network (or other networks, such as WiFi). The individual vehicle 30 then receives the updates via the network interface 31, and installs the modified trigger settings or deletes them via OTA update on the vehicle-internal server 34.

In an alternative exemplary embodiment, direct billing of computing operations in the respective vehicle in obtaining sensor data for generating training data for the driver assistance system or autonomous driving system, through active learning without an auction mechanism, takes place at a fixed but, if applicable, location-dependent price. Such a non-use of the auction mechanism makes sense if, for example, exclusively teams/departments of a company access the data, and they are not competing for the computing capacities in the vehicle. Once multiple teams are competing for access to the vehicles, their sensor data, and their processing, an auction mechanism is required to optimally exploit the computing capacities in the vehicles.

In another exemplary embodiment, the trigger 10 is sent to a globally distributed test vehicle fleet 9 for price calculation, and is then applied to the sensor data 50 to generate e.g. 100 sensor data sets 70. These sensor data sets 70 are supplied to the actor 2 via the application 1, and are billed a price/sensor data set 90 on the basis of the computing cost for collecting the 100 sensor data sets 70. The actor 2 may then order e.g. the collection of 100,000 corresponding sensor data sets 70 by confirming the amount. This approach considerably simplifies use for the actor 2. However, a mechanism that selects which trigger classifiers to apply would have to be applied in every vehicle.

According to another alternative embodiment, one could dispense with the auction mechanism, and a department or a third party could purchase the right to apply its trigger classifiers 13 to a vehicle fleet 9. In this context, said department or third party pays e.g. per vehicle year or vehicle kilometer for which its trigger classifiers will be applied. This simplifies the process considerably. In supplying the trigger classifier, the necessary computing capacity must be checked in order not to risk overloading the system. However, once multiple actors 2 are competing for the computing capacity, this system is not possible. One option would be that an actor 2 may buy into a defined vehicle fleet 9 (e.g. 100,000 vehicles). The next buys into the next vehicle cohort, and so on.

In another exemplary embodiment, aside from being generated manually via an application, triggers 10 may also be generated through an automatically detected need for improvement.

For the exemplary embodiments the following benefits result:

Distribution of the computing capacities in the vehicles with competing actors 2 is enabled.

The option of prioritizing individual trigger classifiers in their application, or placing them in a competition with one another is offered. It is evident therefrom that the developers no longer have to limit the number of trigger classifiers running simultaneously on the vehicle.

The allocation of costs to individual trigger classifiers, and therefore to the respective cost drivers is enabled.

One obtains a mechanism for sanctioning trigger classifiers, the trigger condition of which cumulatively corresponds to the current situation and which are therefore executed, but then do not identify any relevant sensor data, or for promoting trigger classifiers with good trigger condition. The result is that computing capacity is taken advantage of by "poorly" defined trigger classifiers less often, and the "better" defined trigger classifiers receive more computing capacity.

Billing for collection of sensor data for generating training data through third parties is enabled.

According to the driving situation, the probability of being able to identify relevant training data fluctuates significantly. Especially in situations in which potentially relevant training data may be identified, the system offers an option of prioritizing individual classifiers in order to not overload the system. The corresponding mechanism is to dynamically determine the price for the computing operations depending on the probability of obtaining a training data set (auction model). This also enables other actors 2, and competing actors 2, to access the sensor data.

LIST OF REFERENCE NUMERALS

1 Application
2, 2A, 2B Actor
3 Server outside of the vehicle
4 API interface
5 Database
6 Further systems
7 Network
8 OTA update
9 Vehicle fleet
10, 10A, 10B Trigger
11 Condition
12 Computing performance value/Auction bid
13 Trigger classifier
14 Requirement
15 Budget
16 Timeframe
17 Target data format
18 Processing time-point
19 Target data quantity
30 Vehicle
31 Network interface
32 Vehicle sensors
33 Further vehicle systems
34 Vehicle-internal server
35 Sensor range
36 Traffic lights (blue instead of green light)
37 Stop sign
38 Traffic lights (free to turn right)
39 Garbage can
40 Vehicle control module
50 Sensor data
51 Preprocessing module
52 Preprocessed data
53 Learning algorithm
54 Intermediate results
55 Trigger filter module
56 Evaluation module/Auction module
57 Trigger classifier module
58 Value ascertaining module/Pricing module
59 Postprocessing module
60 Storage medium
63 Price for data transmission
54 Minimum price per computing operation
65 Available computing capacity
70 Sensor data set
80 Metadata 81 Time stamp
82 Trigger ID
83 Learning algorithm ID
84 Location
85 Classifier score
86 Vehicle monitoring parameters
87 Data quantity to be transmitted
88 Price per computing operation
89 Number of executed computing operations
90 Price for the sensor data set
100 Trigger statistics
101 Historical share in results
102 Foreseeably required computing capacity
103 Exhausted budget
104 Number of collected sensor data
105 Average computing cost
106 Trigger score
107 Average classifier score
108 Execution rank The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A method for automatically obtaining a sensor data set of a vehicle of a vehicle fleet for training a machine-learning algorithm, comprising:
    receiving, by the vehicle, sensor data of at least one sensor of the vehicle;
    defining or supplying, by a server outside of the vehicle, a plurality of triggers for detecting at least an object or a situation, wherein each trigger comprises a trigger computing performance value, a trigger classifier, and a trigger requirement;
    sending, by a server outside of the vehicle, the plurality of triggers to the vehicle;
    assigning, by the vehicle, a respective priority to the plurality of triggers based on their respective trigger computing performance values;
    applying, by the vehicle, the respective trigger classifier of one or more of the triggers directly or indirectly to the sensor data according to the priority of said triggers, insofar as a computing capacity of a vehicle-internal server of the vehicle permits, from which a respective classifier score results; and
    sending, by the vehicle, the sensor data set to the server outside of the vehicle based on the sensor data of the vehicle for training of the algorithm machine-learning only if the respective classifier score satisfies the trigger requirement of the respective trigger; wherein one of the plurality of triggers contains a value threshold, and the application of the respective trigger classifier is only executed until a computing performance rendered in the vehicle in relation to the respective trigger, multiplied by the computing performance value, still remains below the value threshold.

2. The method of claim 1, wherein each trigger, respectively has a trigger condition, and the respective trigger classifier is only applied under the condition that the sensor data directly or indirectly satisfy the respective trigger condition.

3. The method of claim 1, wherein the objects, the detection of which is to take place with the plurality of triggers, are specified objects or events on or along a roadway.

4. The method of claim 1, wherein the plurality of triggers are sent by the server to at least one further vehicle, where they are used in the vehicle.

5. The method of claim 1, wherein one of the plurality of triggers contains a trigger timeframe, and the trigger classifier is only applied within the trigger timeframe.

6. The method of claim 1, wherein one of the plurality of triggers contains a trigger target data format that specifies a type, a degree of processing, and/or a format of the sensor data set transmitted from the vehicle to the server, and the sensor data set is sent in the trigger target data format.

7. The method of claim 1, wherein one of the plurality of triggers contains a trigger processing time-point that defines a time-point at which the trigger classifier is to be applied, and the method is controlled with the trigger processing time-point.

8. The method of claim 1, wherein one of the plurality of triggers contains a target data quantity with which a quantity of the sensor data sets to be obtained from the vehicle fleet is defined, and the method is terminated when the target data quantity is reached.

9. The method of claim 1, wherein a learning algorithm is applied in the vehicle to the sensor data, from which the respective classifier score results, and wherein the respective trigger classifier is applied to an intermediate result of the learning algorithm.

10. A system comprising a vehicle fleet with a plurality of vehicles, and a vehicle-external server for automatically executing:
    receiving, by a vehicle, sensor data of at least one sensor of the vehicle;
    defining or supplying, by a server outside of the vehicle, a plurality of triggers for detecting at least an object or a situation, wherein each trigger comprises a trigger computing performance value, a trigger classifier, and a trigger requirement;
    sending, by a server outside of the vehicle, the plurality of triggers to the vehicle;
    assigning, by the vehicle, a respective priority to the plurality of triggers based on their respective trigger computing performance values;
    applying, by the vehicle, the respective trigger classifier of one or more of the triggers directly or indirectly to the sensor data according to the priority of said triggers, insofar as a computing capacity of a vehicle-internal server of the vehicle permits, from which a respective classifier score results; and
    sending, by the vehicle, the sensor data set to the server outside of the vehicle based on the sensor data of the vehicle for training of a machine-learning algorithm only if the respective classifier score satisfies the trigger requirement of the respective trigger; wherein one of the plurality of triggers contains a value threshold, and the application of the respective trigger classifier is only executed until a computing performance rendered in the vehicle in relation to the respective trigger, multiplied by the computing performance value, still remains below the value threshold.

11. The method of claim 2, wherein the objects, the detection of which is to take place with the plurality of triggers, are specified objects or events on or along a roadway.

12. The method of claim 2, wherein the plurality of triggers are sent by the server to at least one further vehicle, where they are used in the vehicle.

13. The method of claim 3, wherein the plurality of triggers are sent by the server to at least one further vehicle, where they are used in the vehicle.

14. The method of claim 2, wherein one of the plurality of triggers contains a trigger timeframe, and the trigger classifier is only applied within the trigger timeframe.

15. The method of claim 3, wherein one of the plurality of triggers contains a trigger timeframe, and the trigger classifier is only applied within the trigger timeframe.

16. A method for automatically obtaining a sensor data set of a vehicle of a vehicle fleet for training a machine-learning algorithm, comprising:
- determining or receiving, by the vehicle, sensor data of at least one sensor of the vehicle;
- receiving, by the vehicle, a plurality of triggers;
- assigning, by the vehicle, a respective priority to the plurality of triggers based on trigger computing performance values;
- applying, by the vehicle, a trigger classifier of one or more of the triggers directly or indirectly to the sensor data according to the priority of said triggers, insofar as a computing capacity of a vehicle-internal server of the vehicle permits, from which a respective classifier score results; and
- sending, by the vehicle, the sensor data set based on the sensor data of the vehicle for training of the machine-learning algorithm only if the respective classifier score satisfies a trigger requirement of the respective trigger;

wherein one of the plurality of triggers contains a value threshold, and the application of the respective trigger classifier is only executed until a computing performance rendered in the vehicle in relation to the respective trigger, multiplied by the computing performance value, still remains below the value threshold.

17. The method of claim 16, wherein each trigger, respectively has a trigger condition, and the respective trigger classifier is only applied under the condition that the sensor data directly or indirectly satisfy the respective trigger condition.

18. The method of claim 16, wherein the objects, the detection of which is to take place with the plurality of triggers, are specified objects or events on or along a roadway.

19. The method of claim 16, wherein the plurality of triggers are sent by the server to at least one further vehicle, where they are used in the vehicle.

20. The method of claim 16, wherein one of the plurality of triggers contains a trigger timeframe, and the trigger classifier is only applied within the trigger timeframe.

* * * * *